United States Patent
Lee et al.

(10) Patent No.: US 7,084,925 B2
(45) Date of Patent: Aug. 1, 2006

(54) METHOD AND DEVICE FOR PROCESSING IMAGE DATA FROM NON-INTERLACING TYPE INTO INTERLACING ONE

(75) Inventors: Chuan-Chen Lee, Hsinchu (TW); Chia-Liang Tai, Taipei (TW); Yi-Chieh Huang, Hsinchu (TW)

(73) Assignee: VIA Technologies, Inc., Taipei (TW)

( * ) Notice: Subject to any disclaimer, the term of this patent is extended or adjusted under 35 U.S.C. 154(b) by 533 days.

(21) Appl. No.: 10/233,757

(22) Filed: Sep. 3, 2002

(65) Prior Publication Data

US 2003/0174246 A1    Sep. 18, 2003

(30) Foreign Application Priority Data

Mar. 12, 2002  (TW)  ............... 91104622 A

(51) Int. Cl.
*H04N 11/20* (2006.01)

(52) U.S. Cl. ............................ 348/446
(58) Field of Classification Search ........ 348/446, 348/447, 458, 459, 497
See application file for complete search history.

(56) References Cited

U.S. PATENT DOCUMENTS

| | | | |
|---|---|---|---|
| 4,947,251 A | 8/1990 | Hentschel | |
| 5,146,329 A | 9/1992 | Flamm | |
| 5,247,354 A | 9/1993 | Nakajima | |
| 5,270,714 A | 12/1993 | Tanaka et al. | |
| 5,510,843 A | 4/1996 | Keene et al. | |
| 5,526,051 A * | 6/1996 | Gove et al. | 375/240.01 |
| 5,608,468 A * | 3/1997 | Gove et al. | 348/771 |
| 5,627,555 A | 5/1997 | den Hollander | |
| 5,633,687 A * | 5/1997 | Bhayani et al. | 348/441 |
| 5,657,089 A | 8/1997 | Onagawa | |
| 5,781,241 A * | 7/1998 | Donovan | 348/441 |
| 5,822,008 A | 10/1998 | Inoue et al. | |
| 5,856,963 A | 1/1999 | Inagawa et al. | |
| 5,892,551 A * | 4/1999 | Uematsu | 348/447 |
| 5,894,330 A | 4/1999 | Huang et al. | |
| 5,910,820 A | 6/1999 | Herz et al. | |
| 5,912,710 A * | 6/1999 | Fujimoto | 348/445 |
| 5,912,711 A | 6/1999 | Lin et al. | |
| 5,912,714 A | 6/1999 | Kawamura | |
| 5,914,753 A | 6/1999 | Donovan | |
| 5,936,968 A | 8/1999 | Lyons | |
| 5,963,261 A * | 10/1999 | Dean | 348/446 |
| 5,963,262 A | 10/1999 | Ke et al. | |
| 5,990,965 A | 11/1999 | Herz et al. | |
| 6,002,442 A | 12/1999 | Li et al. | |
| 6,028,641 A | 2/2000 | Kim | |
| 6,069,666 A | 5/2000 | Lyons | |

(Continued)

*Primary Examiner*—Paulos M. Natnael
(74) *Attorney, Agent, or Firm*—Volpe and Koenig, P.C.

(57) ABSTRACT

A method for processing an image to convert a non-interlacing scan data into an interlacing scan data is disclosed. The method includes the steps of receiving a non-interlacing scan data, the non-interlacing scan data including plural pixels, replacing a color space value of a selected one of the pixels in the non-interlacing scan data with a combination of color space values of the selected one pixel and at least one adjacent pixel to obtain a blurringly filtered non-interlacing scan data, scaling the blurringly filtered non-interlacing scan data according to a specific algorithm, and converting the blurringly filtered non-interlacing scan data into an interlacing scan data. An image-processing device for converting a non-interlacing scan data into an interlacing scan data is also disclosed. The device includes a blurring filter, a scaler and a converter.

16 Claims, 8 Drawing Sheets

U.S. PATENT DOCUMENTS

| | | | |
|---|---|---|---|
| 6,084,568 A * | 7/2000 | Premi et al. | 345/603 |
| 6,094,226 A * | 7/2000 | Ke et al. | 348/446 |
| 6,108,041 A * | 8/2000 | Faroudja et al. | 348/446 |
| 6,118,488 A | 9/2000 | Huang | |
| 6,275,234 B1 * | 8/2001 | Iwaki | 345/428 |
| 6,281,933 B1 * | 8/2001 | Ritter | 348/447 |
| 6,285,402 B1 | 9/2001 | Miyazaki et al. | |
| 6,307,896 B1 | 10/2001 | Gumm et al. | |
| 6,346,970 B1 | 2/2002 | Boehlke | |
| 6,359,653 B1 | 3/2002 | Huang | |
| 6,441,857 B1 * | 8/2002 | Wicker et al. | 348/441 |
| 6,563,544 B1 | 5/2003 | Vasquez | |
| 6,597,402 B1 * | 7/2003 | Butler et al. | 348/447 |
| 6,704,056 B1 | 3/2004 | Kitahara et al. | |
| 6,757,022 B1 | 6/2004 | Wredenhagen et al. | |
| 6,795,043 B1 | 9/2004 | Shibata | |
| 6,801,591 B1 | 10/2004 | Frencken | |
| 6,898,327 B1 | 5/2005 | Hrusecky et al. | |
| 2002/0113891 A1 * | 8/2002 | Felts | 348/446 |
| 2003/0007686 A1 * | 1/2003 | Roever | 382/167 |
| 2003/0067552 A1 * | 4/2003 | Leyvi et al. | 348/453 |
| 2003/0095205 A1 | 5/2003 | Orlick et al. | |
| 2003/0098925 A1 | 5/2003 | Orlick | |

* cited by examiner

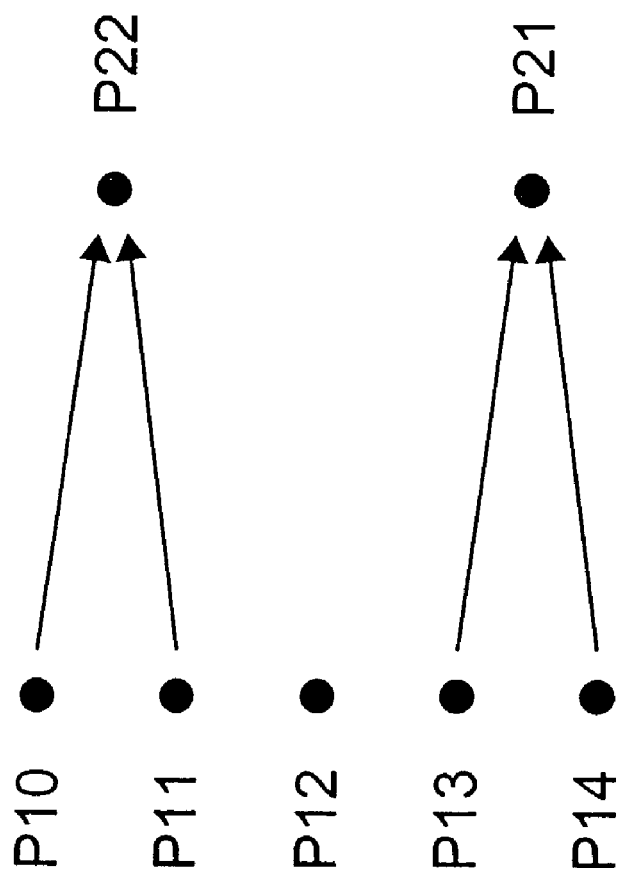

METHOD AND DEVICE FOR PROCESSING IMAGE DATA FROM NON-INTERLACING TYPE INTO INTERLACING ONE

FIELD OF THE INVENTION

The present invention relates to a method for processing an image, and more particularly to a method for processing an image to convert a non-interlacing scan data into an interlacing scan data. The present invention also relates to a device for converting a non-interlacingly scanned image data into an interlacingly scanned image data.

BACKGROUND OF THE INVENTION

Nowadays, many electrical appliances are widely used with computers due to the amazing power of computers. For example, video compact disks (VCDs) and digital versatile disks (DVDs) are able to be played by a personal computer. Since the size of a typical computer monitor is not large enough to exhibit the spectacular video effect of the VCD or DVD disks, it is preferred that the signals be outputted from the personal computer to a TV set to be displayed on the relatively large TV screen. The purpose can be achieved by employing a display adapter.

FIG. 1A is a partial functional block diagram of a typical display adapter. The pixel parallel digital signals from a graphic chip 10 are selectively converted into a proper format of analog signals via either a random access memory digital-to-analog converter (RAM DAC) 11 or a TV encoder 12, and delivered to a computer monitor 13 or a TV screen 14, respectively, for display. Further, for TV analog signals, two formats, i.e. the NTSC (National Television Standards Committee) standard and the PAL (Phase Alternate Line) standard, are involved.

The functional block diagram of the TV encoder 12 can be seen in FIG. 1B. The pixel parallel digital signals from the graphic chip 10 is processed by a data capture device 121, a color space converter 122, a scaler and deflicker 123, an NTSC/PAL encoder 124 and a digital-to-analog converter 125 to produce the TV analog signals either in the NTSC, or PAL standard.

The functional block diagram of a conventional scaler and deflicker 123 can be seen in FIG. 1C. In the NTSC standard and the PAL standard, the numbers of horizontal scan lines are 525 and 625 per frame, respectively, either of which is different from that in the computer monitor standard, e.g. 600 per frame or 768 per frame. Thus, the image data outputted from the color space converter 122 needs to be scaled to be of a proper number of horizontal scan lines by a scaler 1231. The scaling step is usually proceeded by a bilinear algorithm. For example, when five scan lines are scaled into four scan lines, the color space values of the resulting second scanline correlates to those of the original second and third scan lines. Likewise, the color space values of the resulting third scan line correlates to those of the original third and fourth scan lines. For easily understanding the bilinear algorithm operation, each scanning line mentioned in the above is represented by a pixel, and the conversion is illustrated as shown in FIG. 2A. The color space values of the resulting pixel P41 is equal to that of the original pixel P51. The color space values of the resulting pixels P42, P43 and P44 are obtained by the operations of 3(P52)/4+1(P53)/4, 2(P53)/4+2(P54)/4 and 1(P54)/4+3(P55)/4, respectively, in which (P52), (P53), (P54) and (P55) are respective color space values of the original pixels P52, P53, P54 and P55.

Along with the increasing number of horizontal scan lines in each computer monitor frame, for example up to 768, 864, 1024 or even 1200 scan lines, the scaler 1231 needs to proceed a quite large vertical reduction rate. When the scaling factor is down to a value smaller than about 0.7, the problem of losing lines could occur. That is, some horizontal scan lines will not be referred by any of the re-defined scan lines, or the re-defined image data will not incorporate therein the data of the lost line. As shown in FIG. 2B, the pixel P12 indicates a lost line that is referred by neither the pixel P22 nor the pixel P21. Thus, the color data of P12 will lose because of the scaling, resulting in a poor image quality. Likewise, this problem happens when the scaler 1231 processes horizontal scaling.

Therefore, the purpose of the present invention is to develop a method and a device for processing a non-interlacing computer image data into an interlacing TV image data to deal with the above situations encountered in the prior art.

SUMMARY OF THE INVENTION

An object of the present invention is to provide a method and a device for processing an image to convert a non-interlacing scan data into an interlacing scan data for efficiently reducing the losing line problem.

According to an aspect of the present invention, there is provided a method for processing an image to convert a non-interlacing scan data into an interlacing scan data. The method includes the steps of receiving a non-interlacing scan data, the non-interlacing scan data including plural pixels, replacing a color space value of a selected one of the pixels in the non-interlacing scan data with a combination of color space values of the selected one pixel and at least one adjacent pixel to obtain a blurringly filtered non-interlacing scan data, scaling the blurringly filtered non-interlacing scan data according to a specific algorithm, and converting the blurringly filtered and scaled non-interlacing scan data into an interlacing scan data.

Preferably, the combination is a linear combination of color space values of the selected one pixel and two adjacent pixels. For example, the two adjacent pixels can be two pixels just before and after the selected one pixel or two pixels just above and below the selected one pixel.

Preferably, the linear combination has a coefficient of [¼, ½, ¼].

Preferably, the scaling step includes a vertical and/or a horizontal scaling operation.

Preferably, the specific algorithm is a bilinear algorithm.

According to another aspect of the present invention, there is provided a device for processing an image. The device includes a blurring filter device and a scaler. The blurring filter device is used for receiving an image data including plural pixels, and replacing a color space value of a selected one of the pixels in the image data with a combination of color space values of the selected one pixel and at least one adjacent pixel to obtain a blurringly filtered image data. The scaler is in communication with the blurring filter device for receiving and scaling the blurringly filtered image data.

Preferably, the image data and the blurringly filtered image data are non-interlacing scan data.

Preferably, the combination is a linear combination of color space values of the selected one pixel and two adjacent pixels. The linear combination preferably has a coefficient of [¼, ½, ¼].

Preferably, the scaler performs a vertical and/or a horizontal scaling operation according to a bilinear algorithm.
13. horizontal scaling operation.

According to a further aspect of the present invention, there is provided a method for processing an image to convert a non-interlacing scan data into an interlacing scan data. The method includes the steps of receiving a non-interlacing scan data including a plurality of first scan lines, performing a blurringly filtering operation on the non-interlacing scan data to obtain second scan lines, each of the second scan lines incorporating therein color space values of three consecutive the first scan lines, and performing a scaling operation on the blurringly filtered non-interlacing scan data.

Preferably, the blurringly filtering operation is performed by replacing color space values of a selected scan line with a combination of color space values of the selected scan line and a preceding and a following scan lines of the selected scan line. The combination is preferably a linear combination with a coefficient of [¼, ½, ¼].

Preferably, the scaling operation is performed according to a bilinear algorithm.

BRIEF DESCRIPTION OF THE DRAWINGS

The present invention may best be understood through the following description with reference to the accompanying drawings, in which:

FIG. 2B is a schematic diagram illustrating a line-losing situation when performing the typical bilinear algorithm;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
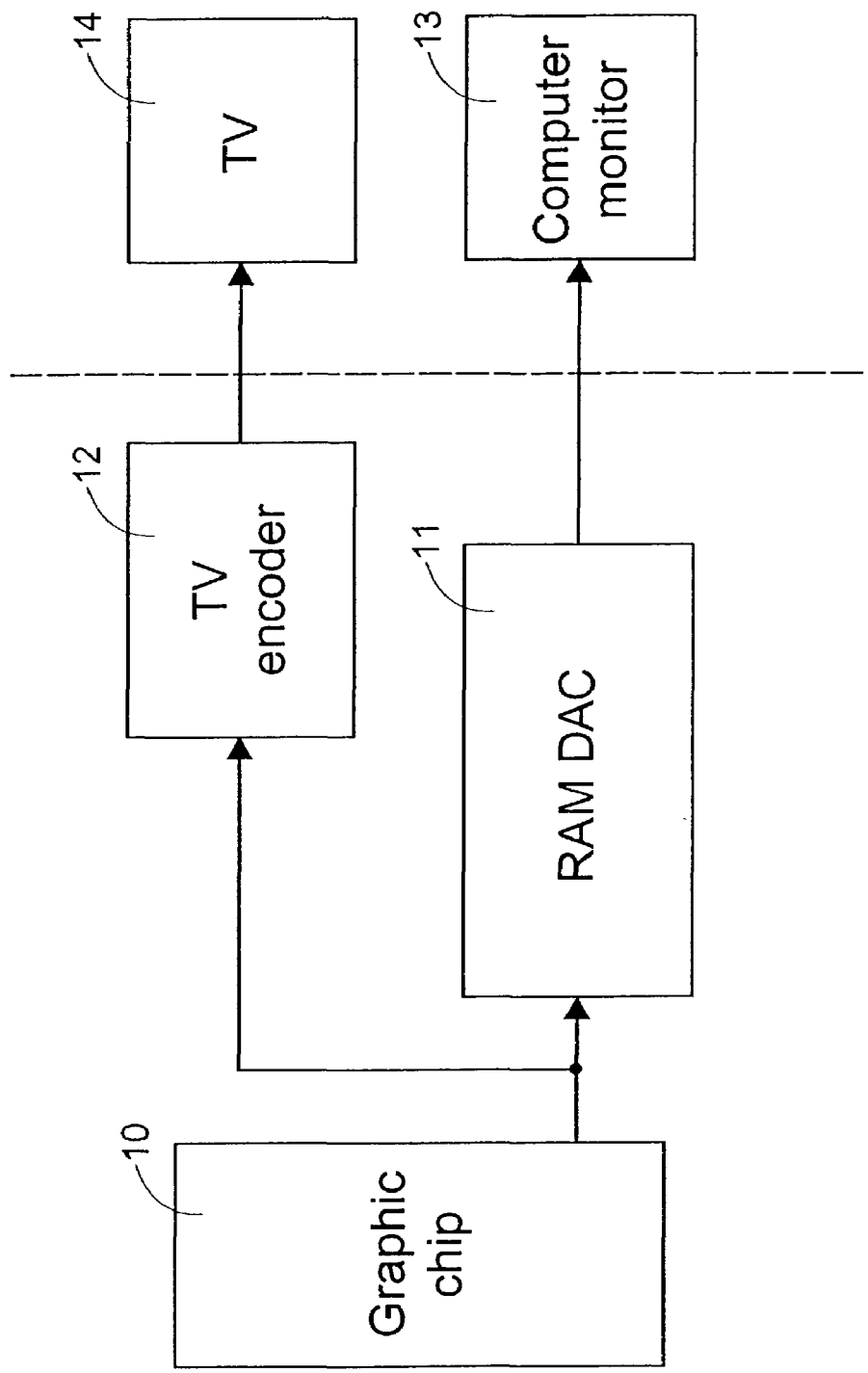
FIG. 1A is a partial functional block diagram illustrating a typical display adapter.
Figure 1B:
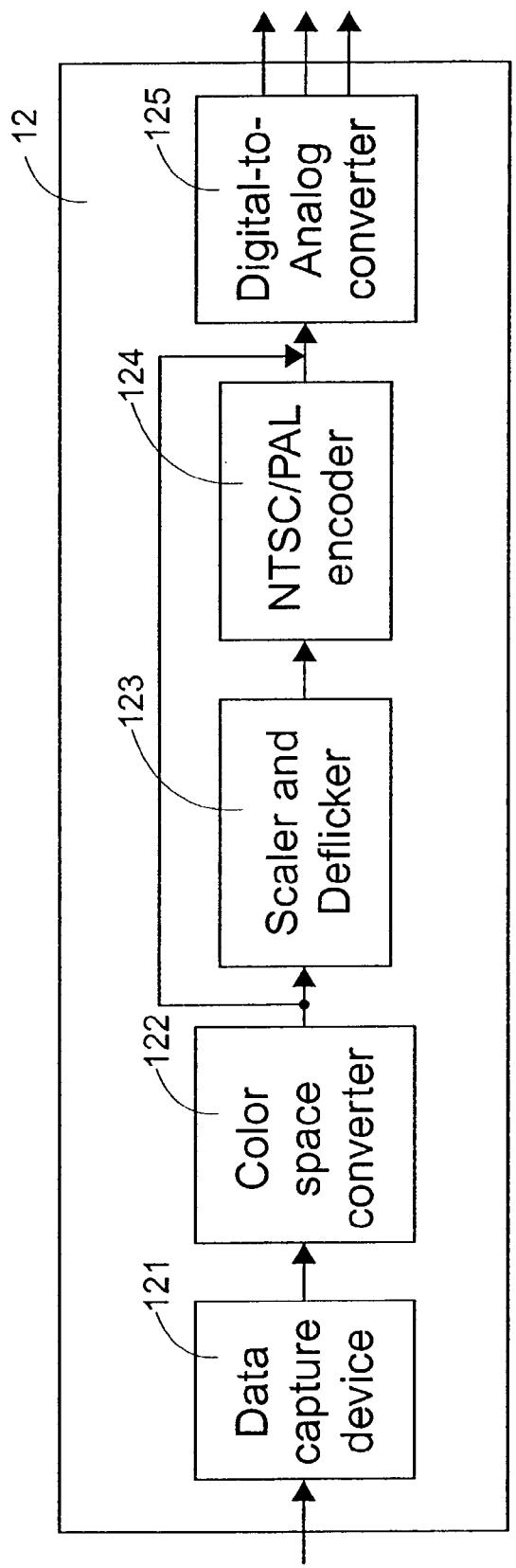
FIG. 1B is a functional block diagram illustrating the TV encoder in FIG. 1A.
Figure 1C:
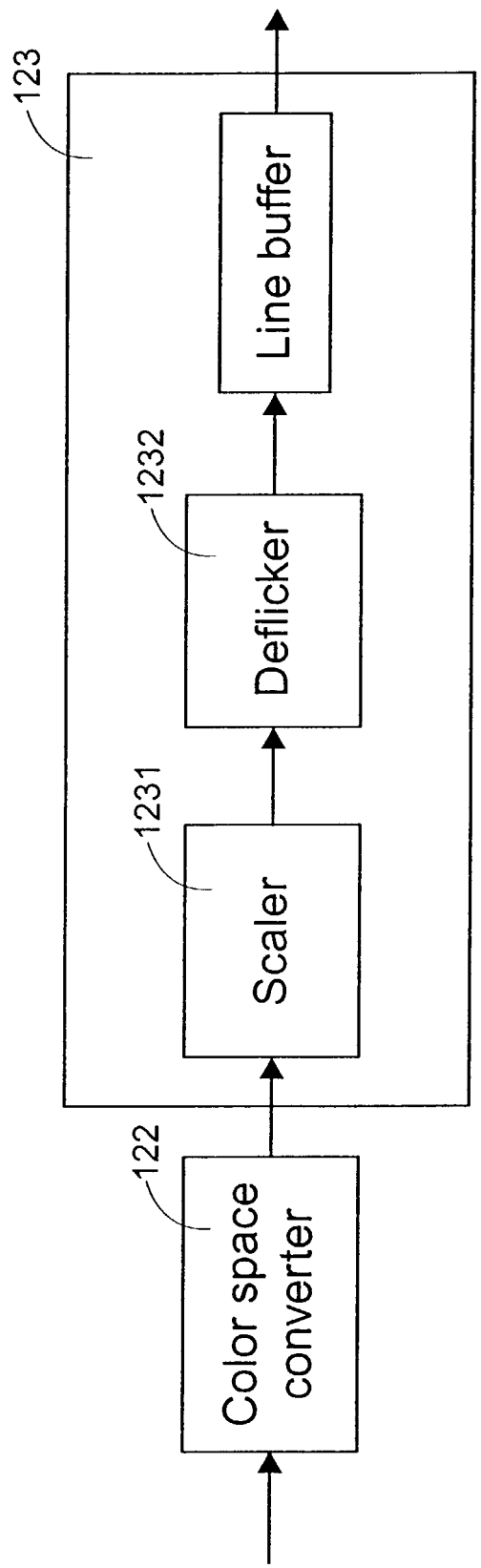
FIG. 1C is a functional block diagram illustrating the scaler and deflicker in FIG. 1B.
Figure 2A:
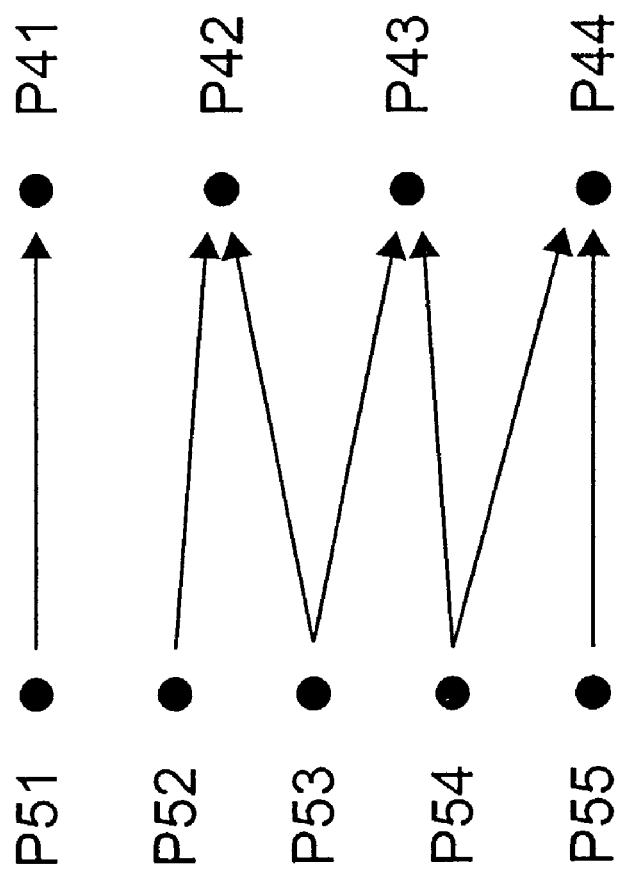
FIG. 2A is a diagram illustrating a conventional bilinear algorithm.
Figure 3A:
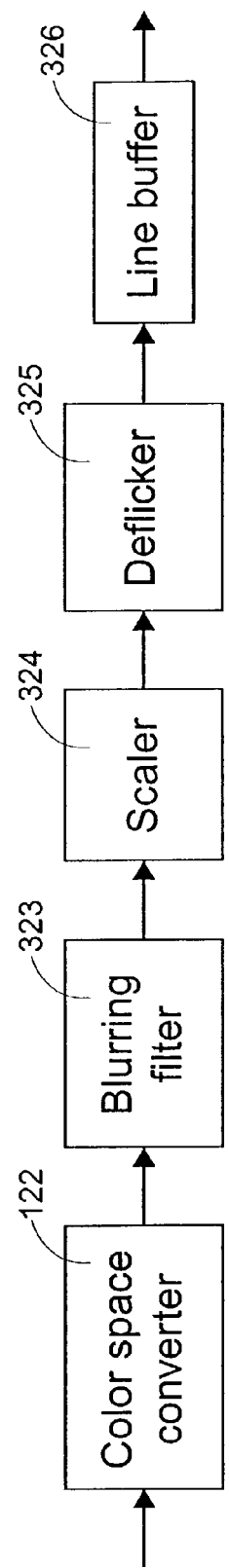
FIG. 3A is a functional block diagram illustrating a preferred embodiment of a TV encoder according to the present invention.

Please refer to FIG. 3A which is a schematic functional block diagram illustrating a preferred embodiment of a blurring filter according to the present invention. After being inputted into a color space converter 122, a non-interlacing scan data consisting of horizontal scan lines is received and processed by a blurring filter 323. The color space value of each scan line, indicated by a single pixel in the figure for simplification purpose, in the non-interlacing scan data is replaced by a combination value of that of the line and the adjacent lines to obtain a blurringly filtered non-interlacing scan data. Subsequently, the blurringly filtered non-interlacing scan data is scaled by a scaler 324 and a deflicker 325, which orerate in a way similar to that illustrated in FIG. 2A, and then converted into an interlacing scan data.

Figure 3B:
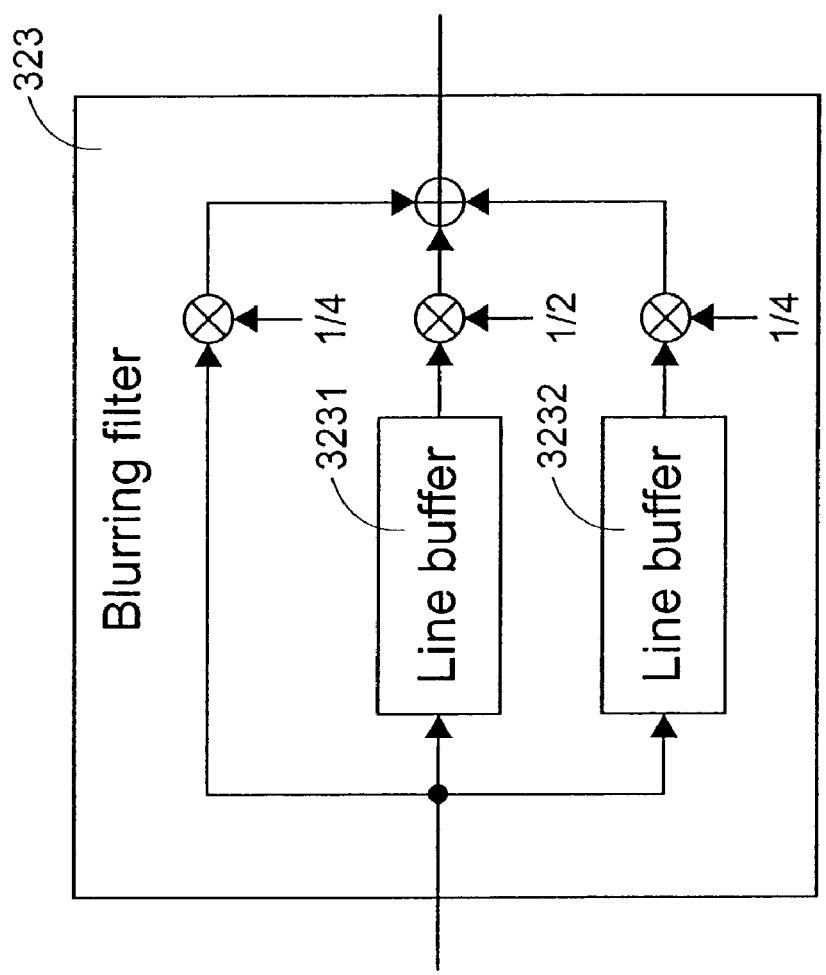
FIG. 3B is a functional block diagram illustrating a preferred embodiment of the blurring filter in FIG. 3A.
Figure 3C:
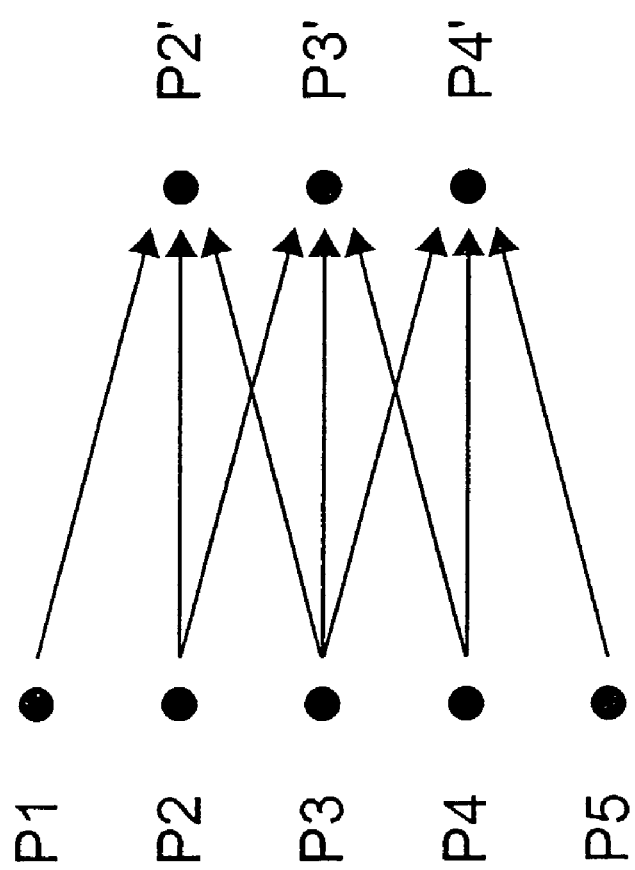
FIG. 3C is a diagram illustrating a preferred embodiment of a blurring operation according to the present invention.

FIG. 3B is a functional block diagram illustrating a preferred embodiment of the blurring filter in FIG. 3A. The blurring filter includes two line buffers 3231 and 3232, which are used for storing two continuous horizontal scan lines of the non-interlacing scan data, respectively. When next line enters, the color space values of the coming horizontal scan line and two previously stored horizontal scan lines are processed by a filter operation to execute a linear combination under the coefficient [¼, ½, ¼]. The resulting color space value replaces the original one of the intermediate scan line to realize a blurringly filtered scan line. That is, the color space value of each horizontal scan line is re-defined by a weighting operation of the color space values of the selected horizontal scan line and two immediately adjacent horizontal scan lines above and below the selected scan lines, respectively. Then, a blurringly filtered non-interlacing scan data is obtained. It is to be noted that the coefficient of the linear combination can be modified according to the practical requirement. For the easy understanding of the present invention, an example is given herein with reference to the diagram of FIG. 3C to describe the present invention in details. In order to simplify the drawing, each scan line is represented by a pixel, and the bluringly filtering conversion is illustrated as shown in FIG. 3C. First of all, the color data of the original pixels P1 and P2 is stored in the line buffers 3232 and 3231, respectively. When the color data of the original pixel P3 is inputted to the blurring filter, the color space value of the resulting pixel P2' is obtained by the operation of (P1)/4+(P2)/2+(P3)/4, in which (P1), (P2) and (P3) are respective color space values of the original pixels P1, P2 and P3. Subsequently, the color data of the original pixels P2 and P3 is stored in the line buffers 3231 and 3232, respectively. Likewise, when the color data of the original pixel P4 is inputted to the blurring filter, the color space value of the resulting pixel P3' is obtained by the operation of (P2)/4+(P3)/2+(P4)/4, in which (P2), (P3) and (P4) are respective color space values of the original pixels P2, P3 and P4. Thus, the color space value of the resulting pixel P2' is defined by the combination value of the color space values of the pixel itself, i.e. (P2), the above-adjacent pixel, i.e. (P1) and the below-adjacent pixel, i.e. (P3). Likewise, the color space value of the resulting pixel P3' is defined by the combination value of the color space values of the pixel itself (P3), the above-adjacent pixel (P2) and the below-adjacent pixel (P4). Similarly, the color space value of the resulting pixel P4' is equal to (P3)/4+(P4)/2+(P5)/4. According to the above embodiment, the color data of the original pixel P3 is incorporated in those of the resulting pixels P2', P3' and P4'. Hence, after the blurringly filtering procedure, the color character of each scan line will be imparted to the adjacent scan lines. Even though a relatively large vertical reduction rate is required for scaling and a line-losing problem is rendered, the color data of the lost line can be revealed by other scan lines. Thus, good image quality can be assured after scaling.

The method and the device for processing an image data according to the present invention, although exemplified to be used in a TV encoder of a TV display adapter can also be used for processing any other image to be vertically or horizontally scaled in order to assure of good image quality.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for processing an image to convert a non-interlacing scan data into an interlacing scan data, comprising the steps of:
receiving a non-interlacing scan data, said non-interlacing scan data consisting of n pixels;
replacing a color space value of a first one of said n pixels in said non-interlacing scan data with a first combination of color space values of said first pixel and at least one adjacent pixel to obtain a blurringly filtered non-interlacing scan data;
scaling said blurringly filtered non-interlacing scan data to result in a non-interlacing scan data consisting of m pixels, wherein m is less than n, and a color space value of a second one of said m pixels in said non-interlacing scan data is replaced with a second combination of color space values of said second pixel and at least one adjacent pixel to obtain a deflickered non-interlacing scan data;
converting said deflickered non-interlacing scan data into an interlacing scan data.

2. The method according to claim 1 wherein said first combination is a linear combination of color space values of said first pixel and two adjacent pixels.

3. The method according to claim 2 wherein said two adjacent pixels are two pixels just before and after said first pixel.

4. The method according to claim 2 wherein said two adjacent pixels are two pixels just above and below said first pixel.

5. The method according to claim 2 wherein said linear combination has a coefficient of [¼, ½, ¼].

6. The method according to claim 1 wherein said scaling step includes a vertical scaling operation.

7. The method according to claim 1 wherein said scaling step includes a horizontal scaling operation.

8. The method according to claim 1 wherein said second combination is based on a bilinear algorithm.

9. The method according to claim 1 wherein said blurringly filtered non-interlacing scan data remains n pixels, and said scaling step reduces the pixel number from n to m.

10. A device for processing an image comprising:
a blurring filter device receiving an image data including plural pixels, and replacing a color space value of a first one of said pixels in said image data with a first combination of color space values of said first pixel and at least one adjacent pixel to obtain a blurringly filtered image data;
a scaler coupling with said blurring filter device for receiving and scaling said blurringly filtered image data to obtain a scaled image data; and
a deflicker receiving said scaled data, and replacing a color space value of a second one of pixels in said scaled image data with a second combination of color space values of said second pixel and at least one adjacent pixel to obtain a deflickered image data.

11. The device according to claim 10 wherein said image data, said blurringly filtered image data, said scaled image data and said deflickered image data are non-interlacing scan data.

12. The device according to claim 10 wherein said first combination is a linear combination of color space values of said first pixel and two adjacent pixels.

13. The device according to claim 12 wherein said linear combination has a coefficient of [¼, ½, ¼].

14. The device according to claim 10 wherein said scaler performs a vertical scaling operation.

15. The device according to claim 10 wherein said scaler performs a horizontal scaling operation.

16. The device according to claim 10 wherein said scaler and said deflicker operate according to a bilinear algorithm.

* * * * *